(12) United States Patent
Sozer et al.

(10) Patent No.: US 11,316,390 B2
(45) Date of Patent: Apr. 26, 2022

(54) TRANSVERSE FLUX MACHINES

(71) Applicants: Yilmaz Sozer, Stow, OH (US); Anik Chowdhury, Akron, OH (US); Shuvajit Das, Akron, OH (US); Naoto Saito, Aichi-ken (JP); Subrata Saha, Aichi-ken (JP); Takamasa Takeuchi, Aichi-ken (JP); Yasunobu Shiotsuki, Aichi-ken (JP); Teppei Tsuda, Aichi-ken (JP)

(72) Inventors: Yilmaz Sozer, Stow, OH (US); Anik Chowdhury, Akron, OH (US); Shuvajit Das, Akron, OH (US); Naoto Saito, Aichi-ken (JP); Subrata Saha, Aichi-ken (JP); Takamasa Takeuchi, Aichi-ken (JP); Yasunobu Shiotsuki, Aichi-ken (JP); Teppei Tsuda, Aichi-ken (JP)

(73) Assignee: The University of Akron, Akron, OH (US)

( * ) Notice: Subject to any disclaimer, the term of this patent is extended or adjusted under 35 U.S.C. 154(b) by 186 days.

(21) Appl. No.: 16/781,084

(22) Filed: Feb. 4, 2020

(65) Prior Publication Data
US 2021/0075276 A1 Mar. 11, 2021

Related U.S. Application Data

(60) Provisional application No. 62/896,668, filed on Sep. 6, 2019.

(51) Int. Cl.
*H02K 1/2789* (2022.01)
*H02K 1/279* (2022.01)
(Continued)

(52) U.S. Cl.
CPC .......... *H02K 1/274* (2013.01); *H02K 1/2793* (2013.01); *H02K 21/16* (2013.01)

(58) Field of Classification Search
CPC ...... H02K 1/274; H02K 21/16; H02K 1/2793; H02K 1/04; H02K 1/08; H02K 1/141;
(Continued)

(56) References Cited

U.S. PATENT DOCUMENTS

| 5,117,142 A | 5/1992 | Von Zweygbergk | 310/156 |
| 5,543,674 A | 8/1996 | Koehler | 310/164 |

(Continued)

FOREIGN PATENT DOCUMENTS

| CA | 2865906 A1 * | 9/2013 | ........... H02K 49/102 |
| CN | 109361300 A * | 2/2019 | |

(Continued)

*Primary Examiner* — Quyen P Leung
*Assistant Examiner* — Christopher Stephen Schaller
(74) *Attorney, Agent, or Firm* — Renner Kenner Greive Bobak Taylor & Weber

(57) ABSTRACT

A transverse flux machine includes a stator assembly consisting of a plurality of shaped cores, each having a base with a plurality of legs with a corresponding gap between each leg and each leg having a winding. A rotor assembly is positioned adjacent the stator assembly and includes a rotor disc, and a rotor ring with a plurality of rotor poles interleaved with a plurality of interpoles. The plurality of rotor poles and plurality of interpoles are radially disposed around the rotor disc. The plurality of rotor poles include a plurality of focused rotor poles interleaved with a plurality of diffused rotor poles.

17 Claims, 8 Drawing Sheets

(51) Int. Cl.
*H02K 1/2793* (2022.01)
*H02K 1/274* (2022.01)
*H02K 21/16* (2006.01)

(58) Field of Classification Search
CPC ...... H02K 1/165; H02K 1/272; H02K 1/2766; H02K 3/12; H02K 3/18; H02K 21/26; H02K 1/276; H02K 2201/12; H02K 1/27
See application file for complete search history.

(56) References Cited

U.S. PATENT DOCUMENTS

| | | | |
|---|---|---|---|
| 5,633,551 A | 5/1997 | Weh | 310/266 |
| 5,854,521 A | 12/1998 | Nolle | 310/12 |
| 5,925,965 A | 7/1999 | Li et al. | 310/268 |
| 6,949,855 B2 | 9/2005 | Dubois et al. | 310/152 |
| 7,830,057 B2 | 11/2010 | Gieras | 310/156.02 |
| 9,270,154 B2 * | 2/2016 | Hibbs | H02K 7/1838 |
| 2004/0155548 A1 | 8/2004 | Rasmussen | 310/168 |
| 2004/0251761 A1 | 12/2004 | Hirzel | 310/156.25 |
| 2008/0211326 A1 | 9/2008 | Kang et al. | 310/44 |
| 2008/0211336 A1 | 9/2008 | Sadarangani et al. | 310/156.02 |
| 2011/0062723 A1 | 3/2011 | Calley et al. | 290/1 R |
| 2012/0235519 A1 | 9/2012 | Dyer et al. | 310/46 |
| 2012/0249035 A1 | 10/2012 | Ueda | 318/400.41 |
| 2012/0262019 A1 | 10/2012 | Smith et al. | 310/156.07 |
| 2018/0351425 A1 * | 12/2018 | Muniz | H02K 21/16 |

FOREIGN PATENT DOCUMENTS

| | | | |
|---|---|---|---|
| EP | 2 159 903 A2 | 3/2010 | H02K 1/14 |
| JP | 2003-339128 | 11/2003 | H02K 1/18 |
| JP | 2016-65294 | 4/2016 | C22C 38/00 |
| JP | 2019-41551 | 3/2019 | |

\* cited by examiner

TRANSVERSE FLUX MACHINES

CROSS-REFERENCE TO RELATED APPLICATIONS

This application claims priority of U.S. Provisional Application Ser. No. 62/896,668 filed Sep. 6, 2019, which is incorporated herein by reference.

TECHNICAL FIELD

The present invention is directed to transverse flux machines. The machine may utilize a rotor assembly interposed between two stators in an axial direction. The rotor assembly provides a plurality of rotor poles interleaved with a plurality of interpoles, wherein the plurality of rotor poles are focused or diffused by either enlarging selected core components with respect to other core components or by enlarging selected magnetic components with respect to other magnetic components.

BACKGROUND ART

Various types of electric machines, also known as motor assemblies, are known, and these machines are configured to optimize performance for any number of factors. As is common in the optimization of motors, optimizing one characteristic may result in poor performance of some other characteristic. Ideally, for electric machines in the form of transverse flux machines, it is desirable to increase the torque density and the motor efficiency.

There are many different constructions proposed to obtain the aforementioned torque density and motor efficiency features. Some configurations or constructions use different shapes of the stator, while configuring the rotors in a correspondingly different way, or by utilizing different shapes for laminations used to construct the rotor and/or the stator.

Transverse flux machines are known to address some of the problems associated with the prior art as they provide a way to direct flux in the electric machines so as to increase torque density. However, such configurations still suffer from high leakage fluxes, thereby impacting the power factor of the motor's drive operation. In transverse flux machine, flux goes both in radial and axial directions which results in high torque density. However flux leakage is the primary concern in the transverse flux machine which reduces the power factor and deteriorates the behavior of the machine which can eventually decrease the torque density.

Different approaches have been tried to decrease the flux leakage in transverse flux machines. One approach is a modified 'C'-Core outer stator transverse flux machine in which 50% of the total magnets remain idle at certain times. And in order to thwart the negative flux linkage through the idle magnets, a soft iron bar may be used between two stator cores. Another approach is to use a radial gap transverse flux machine which has at least two air gaps. In this configuration flux leakage between two adjacent poles of the rotor can decrease the power factor of the machine. Different kinds of arrangement of magnets may also be used which can focus the flux produced by the permanent magnets. However, there can also be leakage flux between two poles of the rotor. Yet another approach is a transverse flux machine which has a rotating flux both in the electric winding and plurality of magnetic poles. Unfortunately, this requires a high number of rotor poles which can create a significant amount of flux leakage and, as a result, deteriorate the performance of the machine.

One solution to the aforementioned problem is to use flux focusing magnets to focus the flux in the rotor laminations. Moreover, flux leakage reduction magnets can be used to improve the machine's performance. However, due to a large number of magnets around the flux focusing, rotor laminations, these flux focusing rotor cores tend to show saturation and there are many leakage paths around these cores. Accordingly, there is a need in the art for transverse flux machines with improved flux leakage paths. It is believed that such an approach can reduce overall magnet weight while keeping the same torque density for the motor.

SUMMARY OF THE INVENTION

In light of the foregoing, it is a first aspect of the present invention to provide a transverse flux machine.

Another aspect of the present invention is to provide A transverse flux machine, comprising a stator assembly comprising a plurality of shaped cores, each shaped core having a base with a plurality of legs with a corresponding gap between each leg, each leg having a winding, a rotor assembly positioned adjacent the stator assembly, the rotor assembly comprising a rotor disc, and a rotor ring comprising a plurality of rotor poles interleaved with a plurality of interpoles, wherein the plurality of rotor poles and the plurality of interpoles are radially disposed around the rotor disc, and wherein the plurality of rotor poles comprise a plurality of focused rotor poles interleaved with a plurality of diffused rotor poles, wherein each plurality of focused rotor poles has either at least one enlarged core component with respect to other core components, or at least two enlarged magnetic components with respect to other magnetic components, and each plurality of diffused rotor poles has either at least two enlarged core components with respect to other core components, or at least one enlarged magnetic component with respect to other magnetic components.

BRIEF DESCRIPTION OF THE DRAWINGS

For a complete understanding of the objects, techniques and structure of the invention, reference should be made to the following detailed description and accompanying drawings, wherein.

DETAILED DESCRIPTION OF THE INVENTION

Generally, the present invention is directed to a transverse flux machine (TFM) which provides a compact and efficient electric machine. As will become apparent the description proceeds, the machine may be configured in substantially two ways with each having their own variations.

Either embodiment may be configured with an axial air gap between the stator and rotor, or a radial air gap between the stator and rotor. As will become apparent as the description proceeds, both embodiments provide a transverse flux path in their respective iron cores. In either embodiment, the rotor comprises permanent magnets and an iron core, wherein the stators comprise effectively E-shaped iron cores with pole windings wound around the three legs of the E-shaped core. Multiphase operation can be obtained on a single stack wherein the number of rotor poles and stator cores may be non-equal.

Embodiment 1

Figure 1:
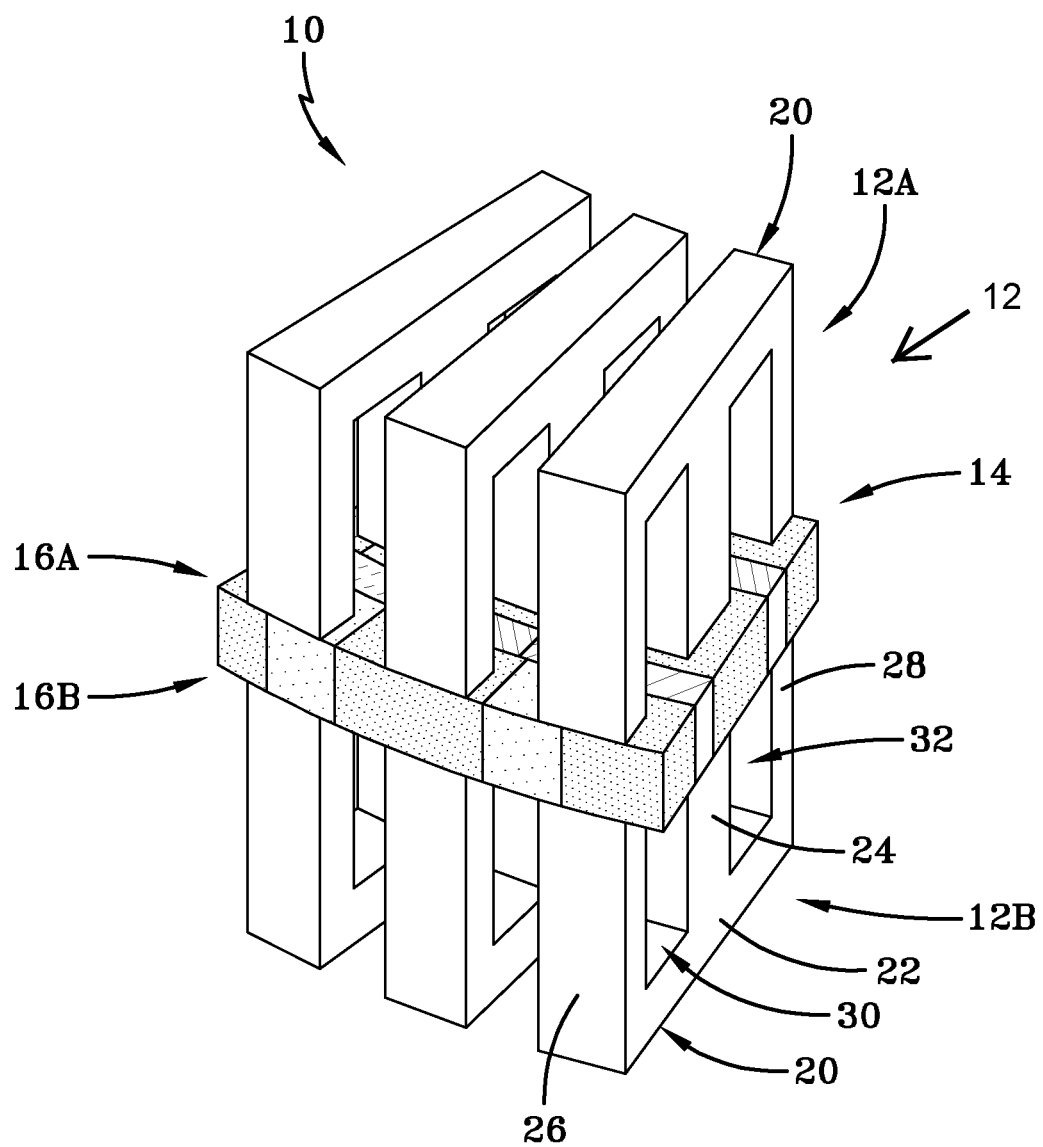
FIG. 1 is a partial perspective view of a transverse flux machine according to the concepts of the present invention.
Figure 2:
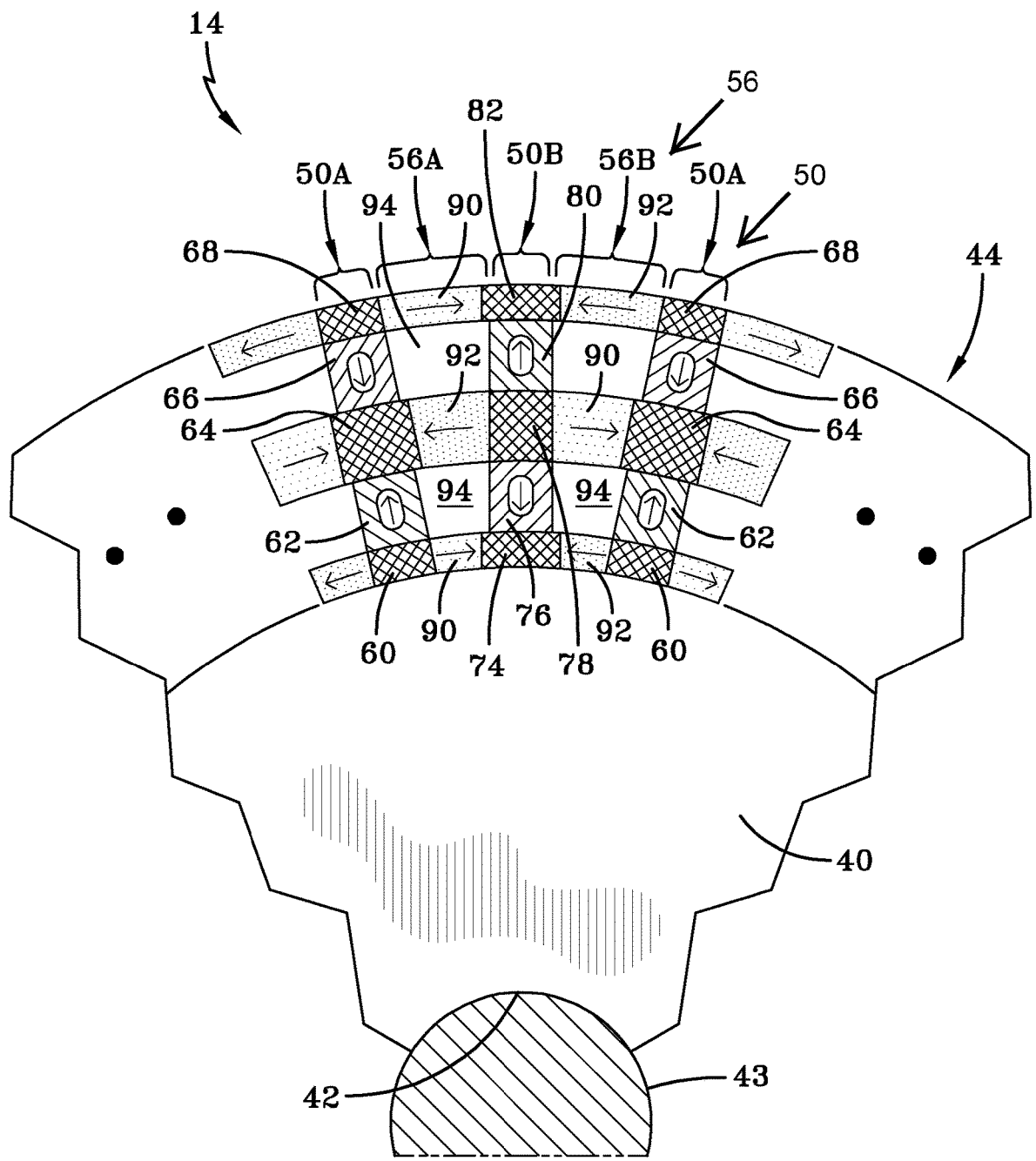
FIG. 2 is a partial top view of a rotor assembly used in the transverse flux machine according to the concepts of the present invention.
Figure 3:
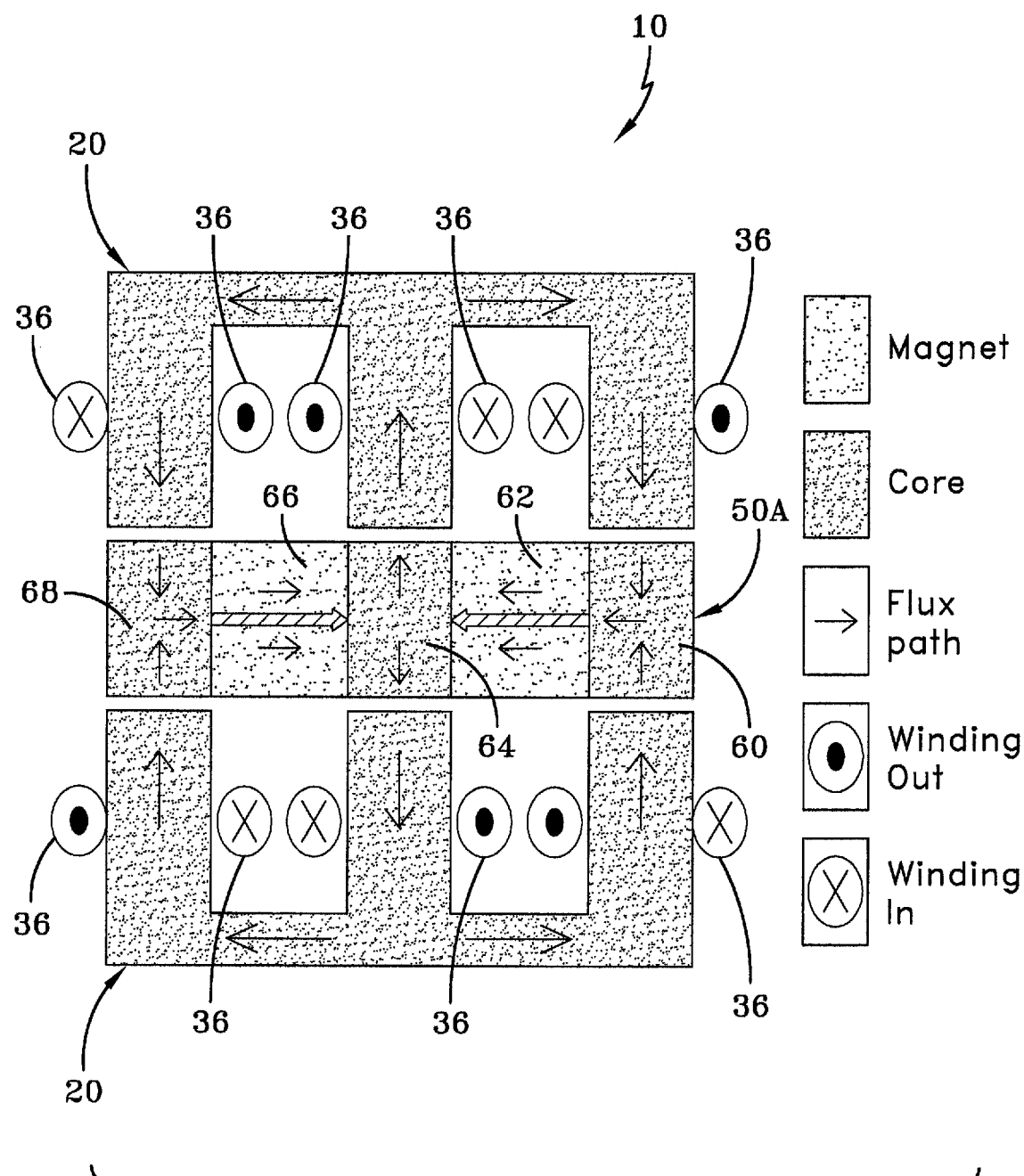
FIG. 3 is a schematic representation of a principal flux path in the transverse flux machine according to the concepts of the present invention.

Referring now to the drawings and in particular to FIGS. 1-3, it can be seen that a transverse flux machine according to one embodiment is designated generally by the numeral 10. The machine 10 includes a stator assembly 12 which may be axially split into split assemblies 12A and 12B such that a rotor assembly 14 is maintained in between the split assemblies 12A and 12B. An axial air gap 16A and 16B is formed between the respective assemblies 12A and 12B and the rotor assembly 14.

As seen in FIGS. 1 and 3, each stator assembly 12 includes a plurality of E-shaped cores 20. Each core 20 includes a base 22 which has a middle leg 24 extending perpendicularly therefrom. Also extending from the base in the same direction as the direction of the middle leg 24 is an outer radial leg 26 and an inner radial leg 28, which is positioned closest to the rotor shaft. The outer radial leg 26 and the middle leg 24 form an outer window gap 30 and, in a similar manner the inner radial leg 28 and the middle leg 24 form an inner window gap 32. As seen in FIG. 3, windings 36 are disposed around each leg as is commonly known in the art. The windings are not shown in FIG. 1, or as will be discussed in regard to FIG. 5 so as to provide clarity of the relationship between the stator assembly and the rotor assembly.

As best seen in FIG. 2, the rotor assembly 14 may include an internal rotor disc 40, which in the present embodiment is made of a non-magnetic material, such as stainless steel. Other non-magnetic materials may be used in place of stainless steel. The internal rotor disc 40 may have a centrally located shaft opening 42 which receives a shaft 43 and is secured thereto. Accordingly, as the rotor disc 40 rotates, the shaft 43 likewise rotates. The shaft drives an attached load as is well understood in the art. Secured to an outer periphery or radial surface of the rotor disc 40 is a rotor ring 44. The rotor ring 44 radially surrounds the disc 40 and comprises core elements and magnets which are interleaved with one another so as to provide an optimal transverse flux machine.

The rotor ring 44 includes a plurality of rotor poles 50 which are radially disposed about the rotor disc 40 and are interleaved with one another. As will be discussed in further detail, the rotor poles alternate between a radially focused rotor pole 50A and a radially diffused rotor pole 50B. Radially interposed between each of the rotor poles 50A and 50B is an interpole 56. And as will also be discussed in further detail, the interpoles 56 alternate between a core focused interpole 56A and a core diffused interpole 56B, both of which coact with the rotor poles 50A and 50B to provide improved performance in the machine 10. Each rotor pole 50A and 50B comprises cores and magnets which are radially positioned with respect to the disc 40. The rotor poles 50A and 50B, and the interpoles 56 are distinguishable from each other in the way flux passes therethrough.

Figure 6:
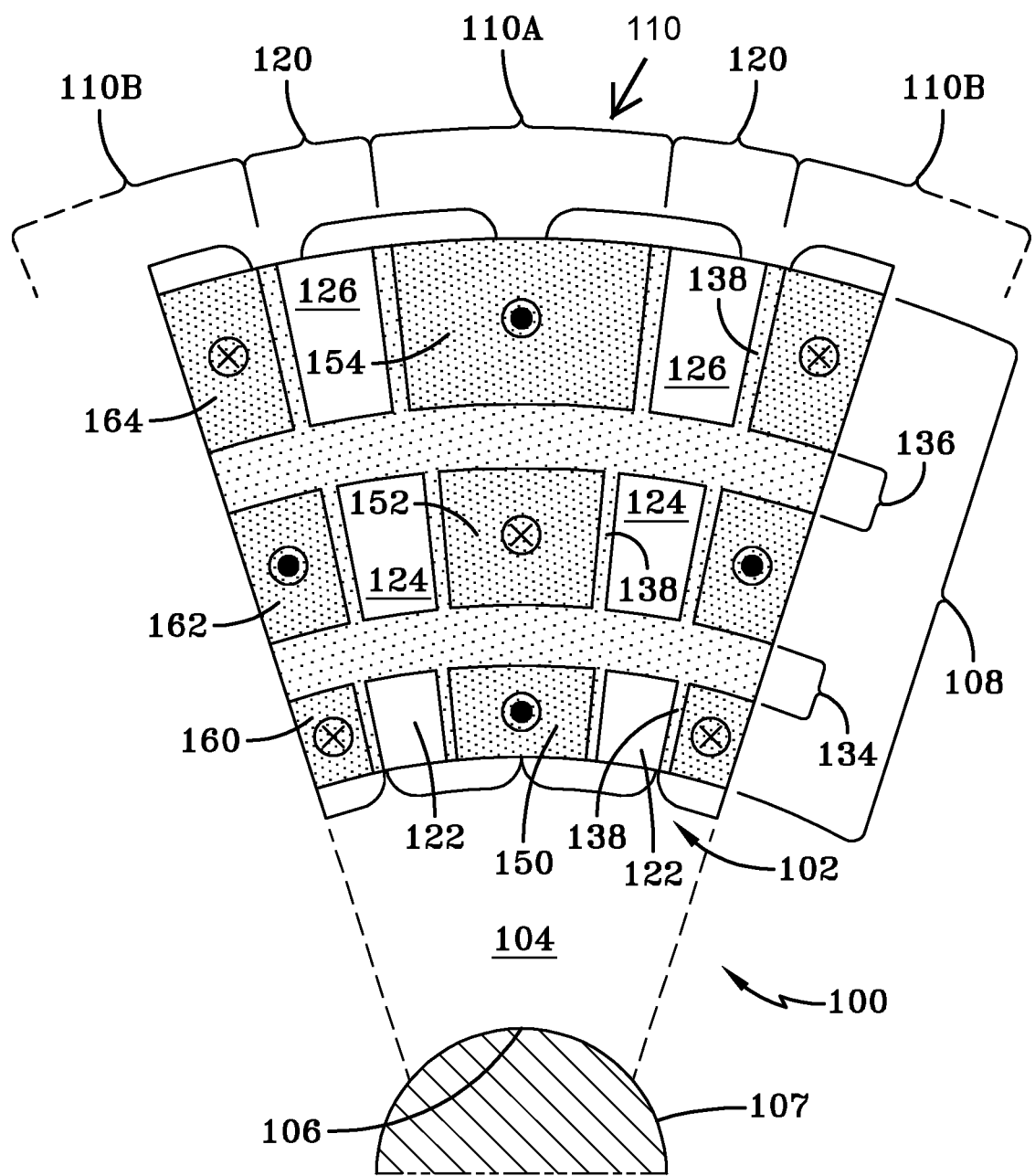
FIG. 6 is a partial top view of an alternative rotor assembly used in another transverse flux machine.

Each pole 50A and 50B includes rotor core components which comprise axially stacked laminated steel plates, wherein all of the plates may be of a uniform thickness. The plates may also be made of any other material suitable for use in any of the embodiments discussed herein. Each pole 50A and 50B also includes magnets, wherein the distinction between the rotor poles is the positioning of a relatively enlarged core or cores with respect to the other cores or core used in the rotor pole, and positioning of the rotor pole cores with respect to the positioning of leakage magnets in the adjacent interpoles. As used herein, an "enlarged" core or magnet refers to the radial span of the core or magnet in the pole. In the rotor assembly of the present embodiment there are a plurality of rotor poles interleaved with plurality of interpoles. In a single pole the flux focusing cores (64, 74, 82 of FIG. 2) are enlarged compared to flux diffusing cores (60, 68 of FIG. 2). The angle span of the flux diffusing and focusing cores will vary depending on the number of rotor poles and interpoles, and the rating of the motor. Similar enlarged magnets can be used for other embodiments as shown in FIG. 6. As used herein, "radially focused" and "radially diffused" refers to the flux path of a centrally located core component in each rotor pole as viewed from one side of the rotor assembly 14 as seen in FIG. 2.

In the present embodiment, the radially focused rotor pole 50A may include a flux diffusing inner core 60 which is positioned radially adjacent the disc 40 wherein the core comprises laminated plates which are stacked axially. Radially and outwardly spaced from the flux diffusing inner core 60 is a radially outward flux focusing magnet 62 which is positioned adjacent an enlarged flux focusing middle core 64, which also provides for laminated plates stacked axially. Radially and outwardly spaced from the middle core 64 is a radially inward flux focusing magnet 66 which is positioned adjacent a flux diffusing outer core 68, which also comprises a plurality of laminated plates stacked axially. In the rotor pole 50A the magnets 62 and 66 are referred to as flux focusing magnets because they both direct flux radially away from their respective adjacent cores 60 and 68, and into the enlarged flux focusing middle core 64.

The radially diffused rotor pole 50B may include an enlarged flux focusing inner core 74 which is positioned radially adjacent the rotor disc 40 and which includes a plurality of axially stacked laminated plates. Positioned radially adjacent the core 74, on a side opposite the disc 40, is a radially inward flux focusing magnet 76. Positioned radially adjacent the magnet 76, on a side opposite the core 74, is a flux diffusing middle core 78. On a side radially adjacent the middle core 78, and on a side opposite the magnet 76, is a radially outward flux focusing magnet 80. And radially adjacent the magnet 80, on a side opposite the core 78, is an enlarged flux focusing outer core 82, which includes a plurality of axially stacked laminated plates. Skilled artisans will appreciate that the magnets 76 and 80 utilized in the radially diffused rotor pole 50B direct flux away from the middle core 78 and into the respective enlarged inner core 74 and the enlarged outer core 82.

For the radially diffused rotor pole 50B, the position of the inward and outward flux focusing magnets are radially switched from the radially focused rotor pole 50A. As a result, for the radially diffused rotor pole 50B, the radial inward flux focusing magnet 76 is positioned in between the flux diffusing middle core 78 and the enlarged flux focusing inner core 74 such that flux is directed radially inward toward the core 74. Positioned in between the flux diffusing middle core 78 and the enlarged flux focusing outer core 82 is the radially outward flux focusing magnet 80. As a result, the magnets 76 and 80 direct any flux radially away from the middle core 78 for the radially diffused rotor pole 50B.

Interposed between each radially focused rotor pole 50A and radially diffused rotor pole 50B is an interpole 56. The interpole provides a q-axis of the rotor and further wherein the middle of the interpole provides a d-axis of the rotor. The interpoles 56 comprise leakage magnets 90 and 92 which are laterally positioned in between the cores of the rotor poles 50A and 50B. As best seen in FIG. 2, depending on where the magnets 90 and 92 are positioned with respect to the cores 60, 64, and 68; and 74, 78, and 82, and whether they are positioned adjacent a radially focused rotor pole 50A or a radially diffused rotor pole 50B, determines placement of a clockwise (CW) leakage reduction magnet 90 or a counterclockwise (CCW) leakage reduction magnet 92. As used herein, the terms clockwise and counterclockwise refer to the direction of the magnet's flux orientation according to the view of the rotor assembly provided in FIG. 2. The placement and/or number of the magnets 90 and 92 determines whether a particular interpole 56 is a clockwise dominant interpole (e.g. core focused interpole 56A) or a counterclockwise dominant interpole (e.g. core diffused interpole 56B). Positioning of the interpoles 56 also facilitates the flux flow to enhance operation of the radially focused rotor poles 50A and radially diffused rotor poles 50B.

For a radially diffused rotor pole 50B, the laterally adjacent interpoles are configured to enhance the flux path away from flux diffusing middle core 78. In particular, the enlarged innermost and outermost cores 74 and 82 are positioned so that a CW leakage reduction magnet 90 is to their left, as shown in FIG. 2, and a CCW leakage reduction magnet 92 is to their right. For the flux diffusing middle core 78, a CCW leakage reduction magnet 92 is positioned to its left, and a CW leakage reduction magnet 90 is positioned to its right.

For a radially focused rotor pole 50A, the laterally adjacent interpoles are configured to enhance the flux path into the enlarged flux focusing middle core 64. In particular, the innermost and outermost cores 60 and 68 are positioned so that a CW reduction magnet 90 is positioned to their lateral right and a CCW reduction magnet 92 is positioned to their lateral left. For the enlarged flux focusing middle core 64, a counterclockwise reduction magnet 92 is laterally positioned to its right, and a clockwise reduction magnet 90 is laterally positioned to its left. With the positioning of the inward and outward flux focusing magnets 62, 66 76, and 80, and the positioning of the leakage magnets 90 and 92, it is evident that flux is directed into the four sides of the enlarged flux focusing cores 64 of the radially focused rotor poles 50A, and away from the four sides of the flux diffusing cores 78 of the radially diffused rotor poles 50B.

Gaps 94 are provided laterally in between the radially adjacent magnets 66 and 80, and radially in between the magnets 62 and 76. Skilled artisans will appreciate that these gaps 94 may be filled with polymeric material in the form of a structural adhesive or other similar material so as to secure the magnets and cores of the rotor ring 44 to one another.

Skilled artisans will appreciate that a ring made of a non-magnetic stainless steel material may be positioned around the outer cores 68 and 82 and the magnets 90 and 92 so as to maintain the structural integrity of the rotor assembly. It can also be seen from FIG. 1 that the stator assembly 12 may be split axially, wherein a stator assembly 12A is positioned on one side of the rotor assembly and a stator assembly 12B is positioned on the other side of the rotor assembly. Although not shown, it will be appreciated that both stator assemblies may be retained by a corresponding end plate which may also be made of a non-magnetic stainless steel material. The ring and the plates may be made of other non-magnetic materials. Extending through each end plate may be a shaft/bearing hole which receives corresponding bearings. The plates may also provide a plurality of mounting holes which allow the machine 10 to be mounted to other structures. Each end plate may have radially disposed thereabout a plurality of core pockets which are arranged around the shaft hole and maintained in substantially equal angular increments.

Referring now to FIGS. 2 and 3, it can be seen that energization of the windings in the stator cores will result in a flux path (represented by the arrows) that is beneficial in generating torque density and providing optimal power efficiency. In particular, it can be seen that for the radially focused rotor pole 50A the magnetic polarity of the magnets and the cores is directed toward the middle rotor core such that the flux leaving the middle rotor core enters the middle leg of the e-cores on the two sides of the rotor ring and are linked back to the magnets through the two outer legs of the E-core. The magnetic polarity and flux direction of the radially diffused rotor 50B pole is in the opposite direction. The E-core stators with pole windings envelop the rotor from two sides in the axial direction. The cores and windings are arranged to that there is a clockwise flux flow in the top right window and an anti or counterclockwise flow in the top left. The flux flow on the other side is mirrored. Hence, the flux is leaving through the middle core and entering through the outer and inner cores. The interpoles 56 provide for additional flux focusing for leakage flux reduction so as to act as flux guides to prevent pole-to-pole leakage and provide additional magneto motive force (MMF) to the machine.

As shown in FIG. 3, flux focusing rotor cores are linking flux to the stator cores. If the flux focusing rotor cores' volume can be increased, which will eventually increase the cross-sectional area of the cores as evidenced in FIG. 2, such a configuration reduces the rotor core reluctance which further reduces the flux leakage paths between the magnets. Moreover, such a configuration decreases the magnet volume and avoids saturation in the flux focusing rotor laminations. Better utilization of the magnetic flux can also be ensured by doing this. Modified rotor laminations where all of the flux focusing rotor cores' volume are increased is as evidenced in FIG. 2. However, as there are leakage paths between stator and magnets, all of the magnetic fluxes are not coming back to the rotor diffusing cores. As a result, flux diffusing rotor cores volume—those that are not enlarged—need not be increased. It can be seen that consecutively all of the flux focusing rotor cores' volumes increased where the flux diffusing rotor cores' volume is kept the same. Skilled artisans will appreciate that the flux leakages are very small and flux distribution is quite good through rotor to stator. Such a configuration may be used for both radial and axial gap transverse flux machines. By utilizing this method it is believed that magnet weight can be reduced up to 15% while keeping the same torque density.

Figure 4:
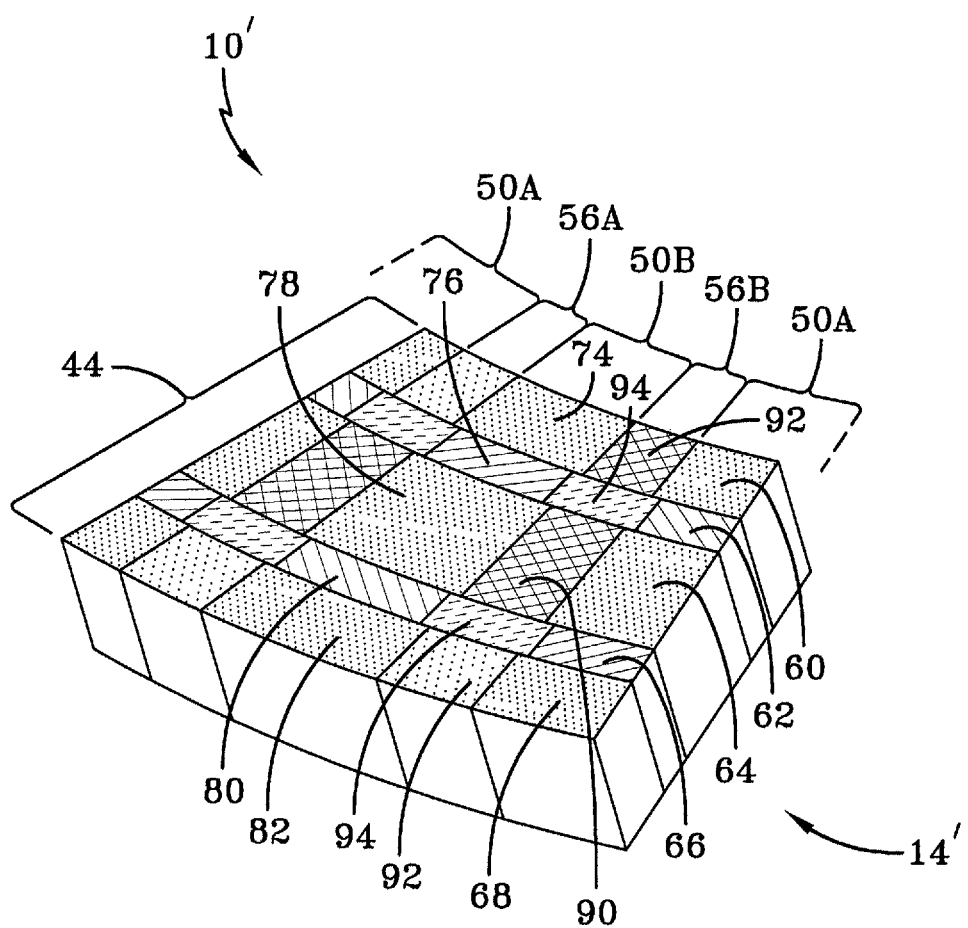
FIG. 4 is a partial perspective view of a skewed rotor assembly used in an alternative transverse flux machine according to the concepts of the present invention.
Figure 5:
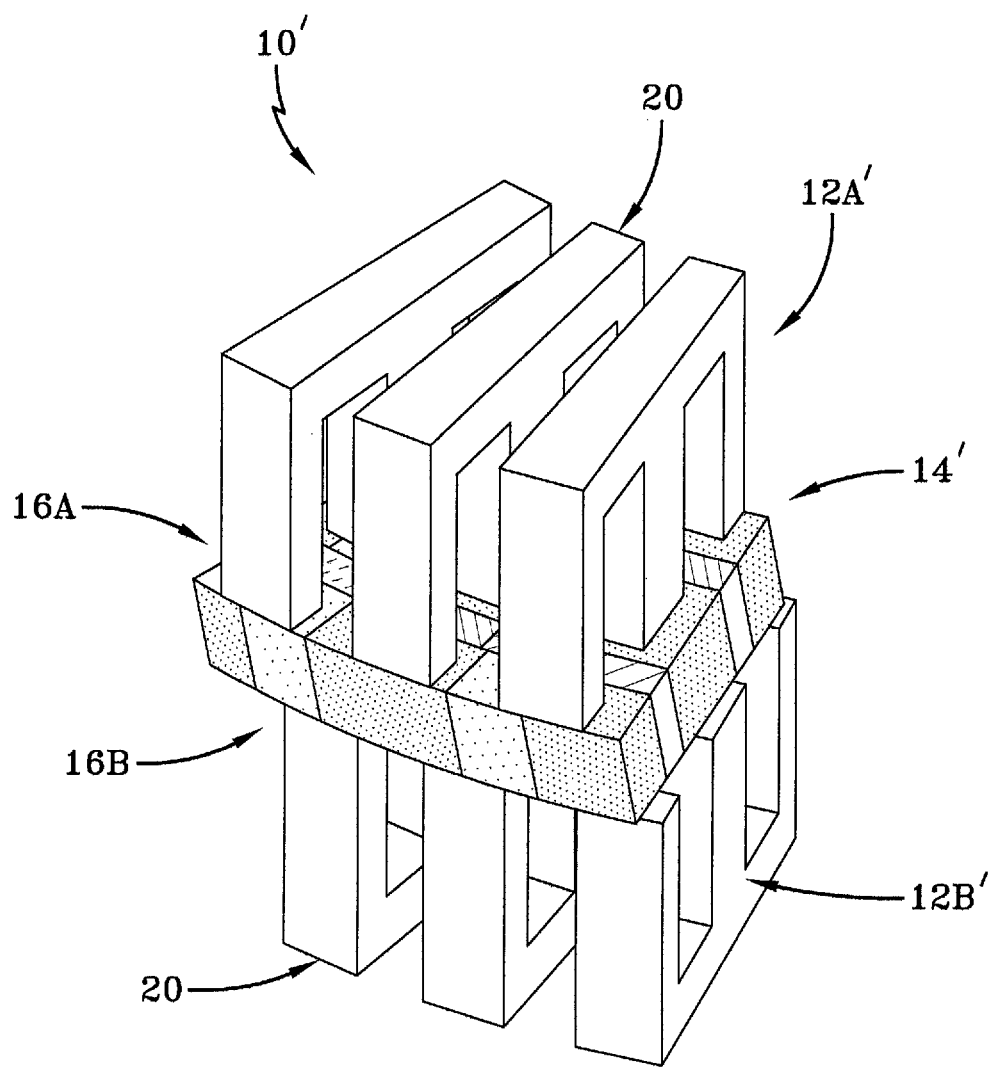
FIG. 5 is a partial perspective view of the alternative transverse flux machine with offset stator assemblies according to the concepts of the present invention.

Referring now to FIGS. 4 and 5, a modified rotor core is designated generally by the numeral 14' and is used in a transverse flux machine designated generally by the numeral 10'. The core 14' is similar to the rotor core and machine 10 shown in FIGS. 1-3, however the constituent components are trapezoidally shaped as opposed to rectangularly shaped. Accordingly, the numbers are otherwise the same for the machine 10' as they are for the machine 10. Skilled artisans will appreciate that by utilizing trapezoidally shaped components that the height of the rotor assembly 14' is slightly reduced. As a result, this skewing of the rotor assembly functions to decrease the leakage flux in the transverse flux machine. However, by keeping the same magnet volume, if the rotor is skewed then the height of the rotor is decreased, which can decrease the reluctance of the rotor cores as reluctance is directly proportional to the length as is well understood in the art. Further, decreasing of the rotor height eventually decreases the height of the overall machine which can improve the torque density of the machine. If the reluctance of the rotor laminations is decreased, flux leakage paths can be decreased which can ensure better utilization of the magnetic flux. Due to the skew in the rotor, shifting between the upper and lower stator is necessary for better flux utilization which can decrease the cogging torque of the machine. Accordingly, in FIG. 5 the stator assemblies 12A' and 12B' are offset from one another so as to accommodate the skewed rotor and facilitate operation of the machine 10'. In other words, the cores 20 in stator assembly 12A' are in a position angularly offset from a position of the cores 20 in the stator assembly 12B'.

Embodiment 2

Referring now to FIG. 6, it can be seen that an alternative transverse flux machine is designated generally by the numeral 100. The machine 100, which may operate with the stator assemblies 12A and 12B as shown in FIG. 1, utilizes a rotor assembly 102 which, much like the previous embodiment, is carried on an internal rotor disc 104 which has a shaft opening 106 extending therethrough and which is sized to receive a shaft 107 such that the rotor assembly rotates the shaft which is connected to a load. The rotor assembly 102 provides for a rotor ring 108 which, as in the previous embodiment, is made up of a plurality of stator poles 110 and a plurality of interpoles 120. In the previous embodiment, the magnetic flux is circulating throughout the rotor core. If the rotor height is not long enough the laminated rotor materials would saturate. It is challenging to keep the rotor laminations not saturated while keeping the short axial length for the rotor. The problem of magnetic saturation is decreased by the rearrangement of the magnets in the rotor surface by bypassing the flux through the rotor not circulating it. Moreover, in the following rotor configuration the magnetic materials are placed in the gap width (q-axis direction) and the q-axis flux path (magnetic circuit) is made stronger. It is believed that this will increase the motor output torque because of the addition of reluctance torque. Accordingly, instead of the flux path being radially diffused and radially focused as in the previous embodiment, in this embodiment the flux paths are axially focused or axially diffused as will become apparent as the discussion proceeds.

The plurality of rotor poles 110 are interleaved with the plurality of interpoles 120. In the present embodiment, the rotor poles comprise a plurality of axially focused rotor poles 110A and a plurality of axially diffused rotor poles 110B. As in the previous embodiment, selected components of the poles may be enlarged with respect to the other components so as to improve the flux flow properties through the rotor assembly. In the present embodiment, the interpoles 120 are made up of three core sections and skilled artisans will appreciate that no magnets are included in the interpoles as will be described.

The interpoles 120 each comprise an inner radial core 122 which is positioned radially adjacent the internal disc 104. Spaced apart from the inner radial core 122 on a side opposite the internal disc 104 is a middle radial core 124. Further spaced apart from the middle radial core 124 on a side opposite the inner radial core 122 is an outer radial core 126. Skilled artisans will appreciate that the cores 122, 124, and 126 may be radially separated from one another by insulated rings. In particular, an insulated inner ring 134 separates the inner radial cores 122 from the middle radial cores 124. In a similar manner, the middle radial cores 124 are separated from the outer radial cores 126 by an insulated outer ring 136. Laterally adjacent the cores 122, 124, and 126 are radial walls 138. These radial walls also function to separate the interpoles 120 from their laterally adjacent rotor poles 110A and 110B. The rings 134, 136, and radial walls 138 may be made of a polymeric material such as a structural adhesive which insulates the cores 122, 124, and 126 from one another and also from the magnetic components carried by the rotor poles 110. The cores 122, 124 and 126 are made of ferromagnetic materials which increase the saliency, the reluctance torque, and the total output torque of the motor.

For this embodiment, the terms "focused" or "diffused" refer to how the magnets—enlarged or normal—and their number are disposed in between the insulated rings and their corresponding flux flow patterns. And an "enlarged" magnet refers to the radial span of the magnet in the pole. As shown in FIG. 6, an encircled dot within a magnet represents flux flow out of the page and an encircled x within a magnet represents flux flow into the page. The axially focused rotor pole 110A incorporates an enlarged inner radial, axially outward flux magnet 150 which is positioned adjacent the disc 104. The magnet 150 is bordered on its lateral sides by the radial walls 138 and along an outward radial edge by the insulated inner ring 134. Positioned radially adjacent the insulated inner ring 134 is a medial radial, axially inward flux magnet 152. It is also bordered on its lateral sides by the radial walls 138 and is positioned radially in between the insulated inner ring 134 and the insulated outer ring 136. Positioned radially adjacent an outer surface of the insulated outer ring 136 is an enlarged outer radial, axially outward flux magnet 154. It is also bordered on its lateral edges by the insulated radial wall 138. As can be seen in FIG. 6, the magnets 150 and 154 are somewhat enlarged with respect to the magnet 152. By enlarging certain components in the poles and accommodating those enlargements, the flux flow properties are improved. In this particular embodiment, the axially focused rotor pole 110A utilizes enlarged magnets for the magnets 150 and 154 such that the flux flows out of the page in regard to the magnets 150 and 154 and into the page for the magnet 152. Accordingly, the flow of the magnet into the page for the center or medial magnet 152 is considered to be axially focused.

For the axially diffused rotor pole 110B, which is positioned on adjacent sides of the axially focused rotor pole 110A wherein the interpoles 120 are positioned in between the rotor poles, it can be seen that the rotor pole 110B comprises an inner radial, axially inward magnet 160 which is positioned radially adjacent the disc 104. The lateral edges of the magnet 160 are enclosed by the radial walls 138 and the radial outer edge of the magnet 160 is surrounded by the insulated inner ring 134. Spaced apart from the magnet 160 is an enlarged medial radial, axially outward magnet 162 which is bordered on its lateral edges by the radial walls 138 and on both its radial edges by the insulated inner ring 134 and the insulated outer ring 136. Positioned radially outward from the medial magnet 162 is an outer radial, axially inward magnet 164. It is bordered on its inner radial edge by the insulated outer ring 136 and on its lateral edges by the radial walls 138. The rotor pole 110B utilizes an enlarged medial radial, axially outward magnet 162. As a result, the flux flow pattern for the rotor pole 110B is such that the flux flow is out of the page for the magnet 162 and into the page for the magnets 160 and 164. It is believed that the arrangements of the poles 110A and 110B, and the interpoles 120 will increase the motor output torque because of the addition of the reluctance torque.

Figure 7:
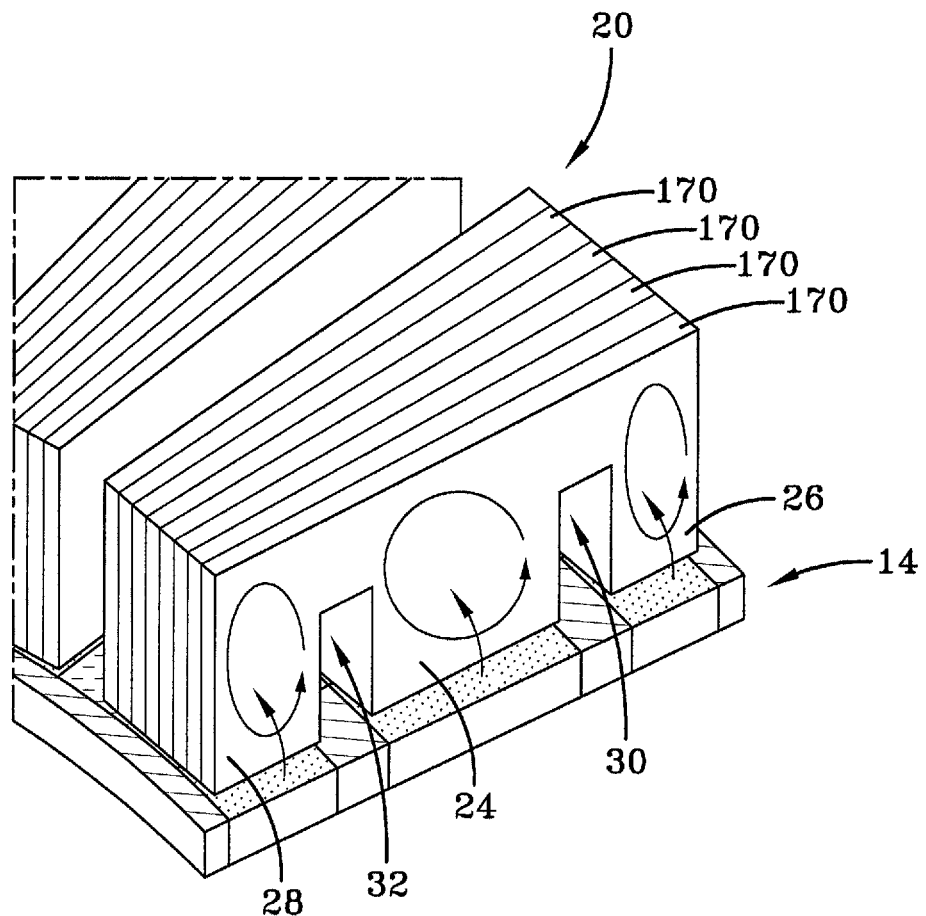
FIG. 7 is a partial perspective view of the stator assembly used in the transverse flux machine according to the concepts of the present invention.

Referring now to FIG. 7, it can be seen that the stator assembly 12 incorporates E-shaped cores 20. The cores 20 are formed by laminations 170 which are stacked perpendicularly to the rotor core 14. This configuration of the stator assembly 12 may be utilized with the embodiment shown in FIGS. 1-3. Since the cores are stacked perpendicularly to the rotating direction of the rotor, it is believed that high eddy current losses may be generated within the stator core. This is because the flux from the rotor magnets enter or leave the laminated E-core stack in the orthogonal (perpendicular) direction.

Figure 8:
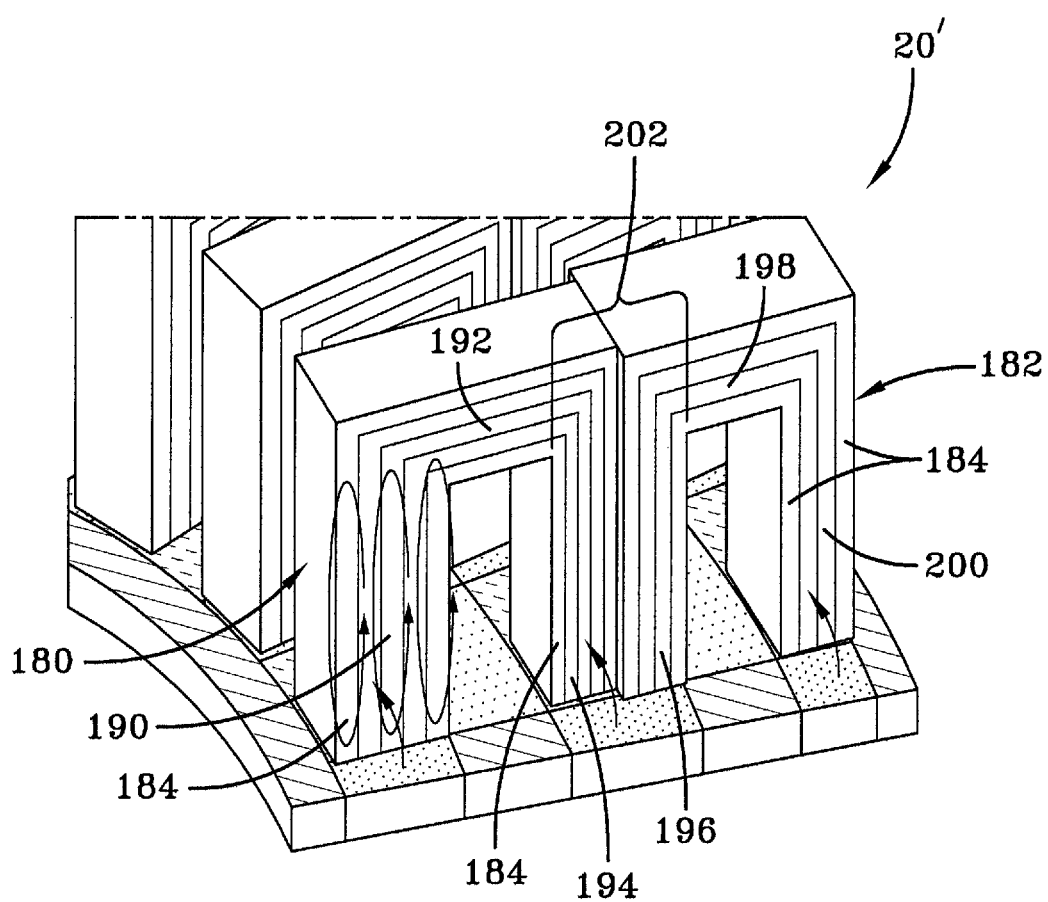
FIG. 8 is a partial perspective view of an alternative stator assembly used with the alternative rotor assembly used in another transverse flux machine according to the concepts of the present invention.

For the embodiment shown in FIG. 6, an E-shaped core 20' is utilized as shown in FIG. 8. In this embodiment, a pair of stacked C-cores may be utilized. In such a configuration, an inner C-core 180 is positioned adjacent an outer C-core 182. Both cores 180 and 182 are constructed of C-shaped laminations wherein the laminations of the inner core 180 are slightly narrower in width than the laminations provided in the C-core 182.

The inner C-core 180 includes an inner leg 190 connected to an inner core base 192 from which extends a medial inner leg 194 that extends in the same direction as the inner leg 190. In a similar manner, the outer C-core 182 provides for a medial outer leg 196 which will be positioned next to the other medial inner leg 194 provided by the inner C-core 180. Extending from the outer leg 196 is a base 198 which has a width a bit wider than the inner C-core base 192. Extending substantially perpendicularly downward from the base 198, in the same direction as the medial outer leg 196, is an outer leg 200. When positioned adjacent one another, the medial inner leg 194 and the medial outer leg 196 form a middle leg 202. With the laminations configured in such a manner, it is believed that eddy current losses will be minimized. In other words, the C-cores which together form the E-core, are configured such that the flux from the rotor magnets does not enter or leave the laminated E-core stack in the orthogonal (perpendicular) direction and hence the eddy current losses are reduced in the stator core. Such a configuration in the first embodiment reduces the leakage flux and increases the output torque. However, since the stator E-core with an arc shape is difficult to realize with a cut core, the E-core is divided into one inner C-core and one outer C-core with different leg width dimensions.

Based upon the foregoing description, the advantages of the present invention are readily apparent. As noted in the Background Art, the high leakage fluxes impact power factor or the drive operation and result in saturation of the rotor laminations. These problems are addressed by utilizing an unequal area for the focusing and diffusing magnets on the rotor. The arrangement of the magnets on the rotor surface facilitates improved flux flow patterns. In other words, the machines described herein increase the torque density and the efficiency of the electric machines. These machines provide a new way to direct the flux in the electric machines so as to increase the torque density. The proposed configurations use unequal areas for the focusing and diffusing magnets to reduce the flux leakage. Magnetic saturation is prevented by the rearrangement of the magnets in the rotor surface and hence the decrease of torque does not occur. Transformer type cut cores are proposed to meet the stator E-core configuration. As a result, the flux for the rotor magnets do not enter or leave the laminated E-core stack in the orthogonal (perpendicular) direction and hence the eddy current losses are reduced in the stator core. To facilitate manufacturing of the stator poles, the E-core is divided into one inner C-core and one outer C-core with different leg width dimensions.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A transverse flux machine, comprising:
    a stator assembly comprising:
        a plurality of shaped cores, each said shaped core having a base with a plurality of legs with a corresponding gap between each said leg, each said leg having a winding, where said plurality of shaped cores are E-shaped;
    a rotor assembly positioned adjacent said stator assembly, said rotor assembly comprising:
        a rotor disc, and
        a rotor ring comprising a plurality of rotor poles interleaved with a plurality of interpoles, wherein said plurality of rotor poles and said plurality of interpoles are radially disposed around said rotor disc, and
    wherein said plurality of rotor poles comprise a plurality of focused rotor poles interleaved with a plurality of diffused rotor poles, wherein each said plurality of focused rotor poles has either
        at least one enlarged core component with respect to other core components, or
        at least two enlarged magnetic components with respect to other magnetic components;
    and each said plurality of diffused rotor poles has either
        at least two enlarged core components with respect to other core components, or
        at least one enlarged magnetic component with respect to other magnetic components.

2. The machine according to claim 1, where each said interpole comprises either all core components or all magnetic components, where said core components or said magnetic components are insulated from one another by polymeric material.

3. A transverse flux machine, comprising:
    a stator assembly comprising:

a plurality of shaped cores, each said shaped core having a base with a plurality of legs with a corresponding gap between each said leg, each said leg having a winding;
a rotor assembly positioned adjacent said stator assembly, said rotor assembly comprising:
a rotor disc, and
a rotor ring comprising a plurality of rotor poles interleaved with a plurality of interpoles, wherein said plurality of rotor poles and said plurality of interpoles are radially disposed around said rotor disc, and
wherein said plurality of rotor poles comprise a plurality of focused rotor poles interleaved with a plurality of diffused rotor poles, wherein each said plurality of focused rotor poles has either
at least one enlarged core component with respect to other core components, or
at least two enlarged magnetic components with respect to other magnetic components;
and each said plurality of diffused rotor poles has either
at least two enlarged core components with respect to other core components, or
at least one enlarged magnetic component with respect to other magnetic components,
where each said interpole comprises either all core components or all magnetic components, where said core components or said magnetic components are insulated from one another by polymeric material, and
wherein each said rotor pole comprises a radially outward flux focusing magnet and a radially inward flux focusing magnet.

4. The machine according to claim 3, wherein each said rotor pole comprises:
an inner core positioned adjacent said rotor disc;
a middle core separated from said inner core by one of said radially outward flux focusing magnet and said radially inward flux focusing magnet; and
an outer core separated from said middle core by the other of said radially outward flux focusing magnet and said radially inward flux focusing magnet.

5. The machine according to claim 4, wherein each of said plurality of focused rotor poles comprises:
said inner core;
said radially outward flux focusing magnet positioned radially adjacent said inner core;
said middle core positioned radially adjacent said radially outward flux focusing magnet on a side opposite said inner core, wherein said middle core is said at least one enlarged core component;
said radially inward flux focusing magnet positioned radially adjacent said middle core on a side opposite said radially outward flux focusing magnet; and
said outer core positioned radially adjacent said radially inward flux focusing magnet.

6. The machine according to claim 5, wherein one said interpole adjacent said focused rotor pole comprises at least one clockwise leakage magnet which focuses flux onto one lateral side of said middle core and wherein the other said interpole adjacent said focused rotor pole comprises at least one counterclockwise magnet which focuses flux into an opposite lateral side of said middle core.

7. The machine according to claim 5, wherein one said interpole adjacent said diffused rotor pole comprises at least one clockwise leakage magnet which diffuses flux away from one lateral side of said inner and outer cores, and wherein the other said interpole adjacent said diffused rotor pole comprises at least one counterclockwise magnet which diffuses flux away from an opposite lateral side of said inner and outer cores.

8. The machine according to claim 4, wherein each said plurality of diffused rotor poles comprises:
said inner core, wherein said inner core is one of said at least one enlarged core components;
said radially inward flux focusing magnet positioned radially adjacent said inner core;
said middle core positioned radially adjacent said radially inward flux focusing magnet on a side opposite said inner core;
said radially outward flux focusing magnet positioned radially adjacent said middle core on a side opposite said radially inward flux focusing magnet; and
said outer core positioned radially adjacent said radially outward flux focusing magnet on a side opposite said middle core, wherein said outer core is another of said at least one enlarged core components.

9. The machine according to claim 8, wherein one said interpole adjacent said diffused rotor pole comprises:
at least one clockwise leakage magnet which diffuses flux away from one lateral side of said middle core;
and wherein the other said interpole adjacent said diffused rotor pole comprises at least one counterclockwise magnet which diffuses flux away from an opposite lateral side of said middle core.

10. The machine according to claim 8, wherein one said interpole adjacent said diffused rotor pole comprises at least one clockwise leakage magnet, wherein said at least one clockwise leakage magnet focuses flux into one lateral side of said inner and outer cores, and
wherein the other said interpole adjacent said diffused rotor pole comprises at last one counterclockwise magnet, wherein said at least one counterclockwise magnet focuses flux into an opposite lateral side of said inner and outer cores.

11. A transverse flux machine, comprising:
a stator assembly comprising:
a plurality of shaped cores, each said shaped core having a base with a plurality of legs with a corresponding gap between each said leg, each said leg having a winding;
a rotor assembly positioned adjacent said stator assembly, said rotor assembly comprising:
a rotor disc, and
a rotor ring comprising a plurality of rotor poles interleaved with a plurality of interpoles, wherein said plurality of rotor poles and said plurality of interpoles are radially disposed around said rotor disc, and
wherein said plurality of rotor poles comprise a plurality of focused rotor poles interleaved with a plurality of diffused rotor poles, wherein each said plurality of focused rotor poles has either
at least one enlarged core component with respect to other core components, or
at least two enlarged magnetic components with respect to other magnetic components;
and each said plurality of diffused rotor poles has either
at least two enlarged core components with respect to other core components, or
at least one enlarged magnetic component with respect to other magnetic components,
where each said interpole comprises either all core components or all magnetic components, where said core components or said magnetic components are insulated from one another by polymeric material, and wherein each said rotor pole comprises at least one axially focused radial magnet and at least one axially diffused radial magnet.

12. The machine according to claim 11, wherein each said interpole comprises:
    an inner core positioned adjacent said rotor disc;
    a middle core positioned adjacent said inner core; and
    an outer core positioned adjacent said middle core, wherein said inner core, said middle core, and said outer core are electrically insulated from one another by a polymeric material.

13. The machine according to claim 12, wherein each of said plurality of focused rotor poles comprises:
    an inner, axially outward flux magnet positioned radially adjacent said rotor disc, wherein said inner, axially outward flux magnet is one of said at least two enlarged magnetic components;
    a medial, axially inward flux magnet positioned radially adjacent said inner, radially outward flux magnet on a side opposite said rotor disc; and
    an outer, axially outward flux magnet positioned radially adjacent said medial, axially inward flux magnet on a side opposite said inner, axially outward flux magnet, wherein said outer, axially outward flux magnet is another of said at least two enlarged magnetic components.

14. The machine according to claim 12, wherein each of said plurality of diffused rotor poles comprises:
    an inner, axially inward flux magnet positioned radially adjacent said rotor disc;
    a medial, axially outward flux magnet positioned radially adjacent said inner, axially inward flux magnet on a side opposite said rotor disc, wherein said medial, axially outward flux magnet is said at least one enlarged magnetic component; and
    an outer, axially inward flux magnet position radially adjacent said medial axially outward flux magnet on a side opposite said inner, axially inward flux magnet.

15. The machine according to claim 12, wherein each of said plurality of focused or diffused rotor poles comprises:
    ferromagnetic rotor core sections used beside each of a plurality of inner, axially inward flux magnets, each of a plurality of outer, axially inward flux magnets, and each of a plurality of medial, axially outward flux magnets to increase the saliency and the reluctance torque and thus improve the output torque of the machine.

16. The machine according to claim 12, wherein each said shaped core comprises:
    an inner C-core; and
    an outer C-core positioned radially adjacent said inner C-core, wherein said inner C-core and said outer C-core have laminations that are substantially parallel to a rotating direction of said rotor ring.

17. The machine according to claim 16, wherein said inner C-core comprises:
    an inner leg, and
    a medial inner leg connected to said inner leg by an inner core base;
    and wherein said outer C-core comprises
    a medial outer leg, and
    an outer leg connected to said medial outer leg by an outer core base;
    said medial inner leg and said medial outer leg are positioned adjacent each other to form a middle leg spaced apart from said inner leg and said outer leg.

* * * * *